Feb. 2, 1943.    R. W. HARROUN ET AL    2,309,766
AUTOMOTIVE TRAIN
Filed Sept. 16, 1939    3 Sheets-Sheet 2
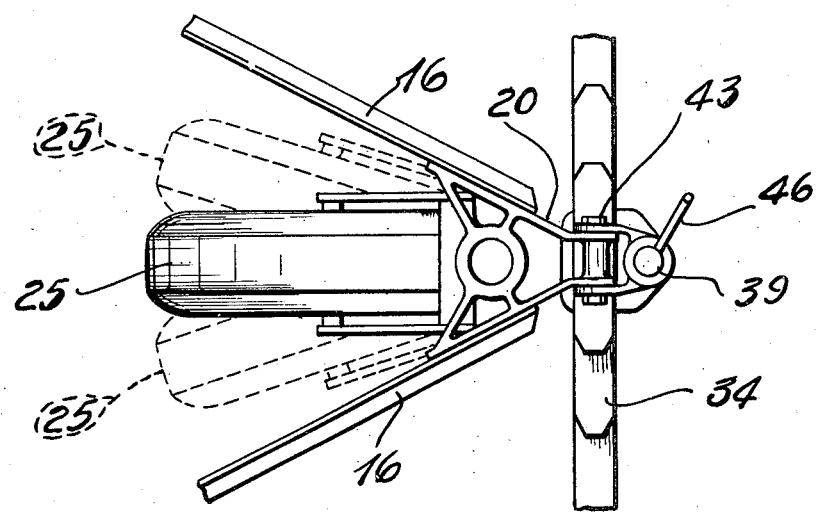
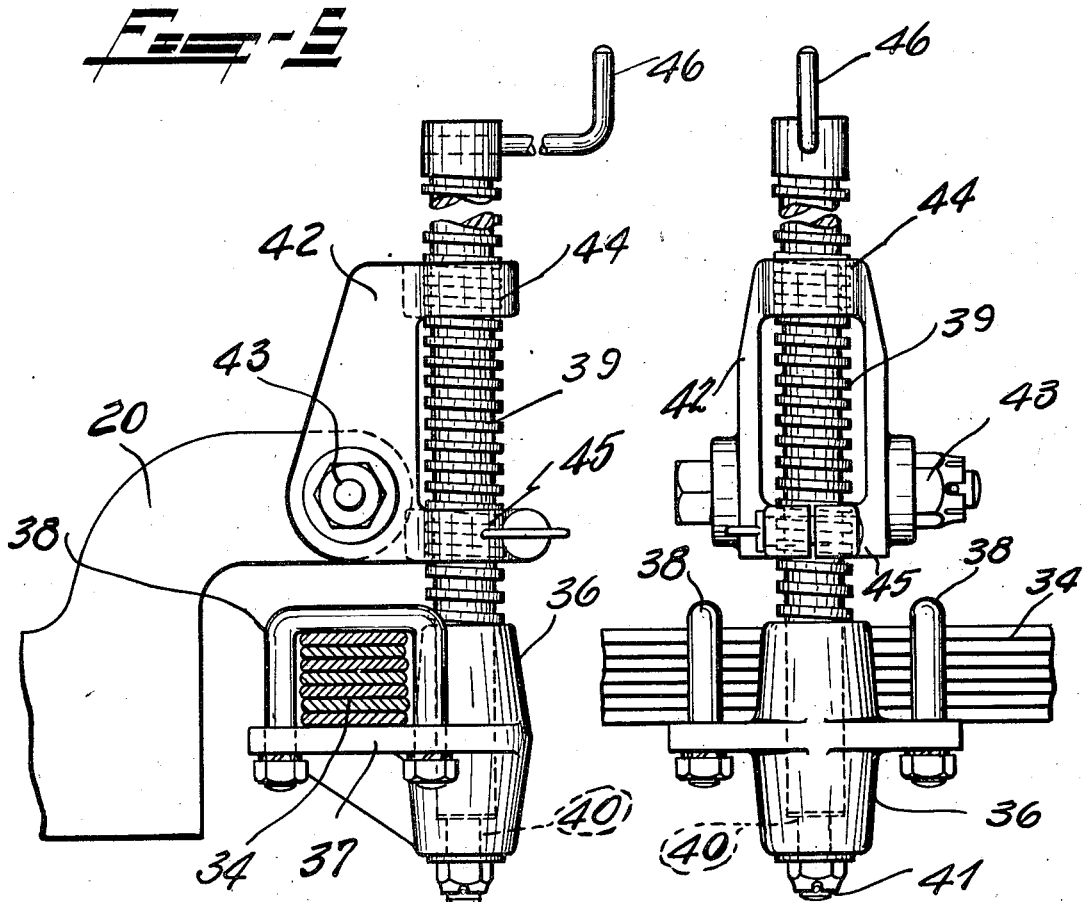

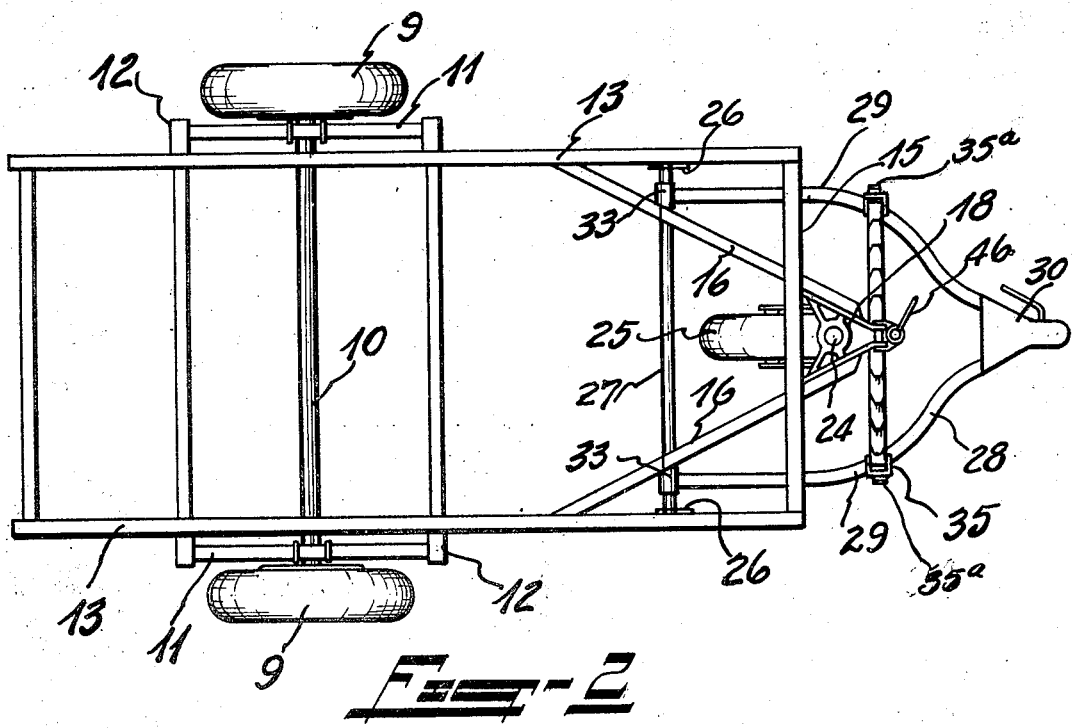
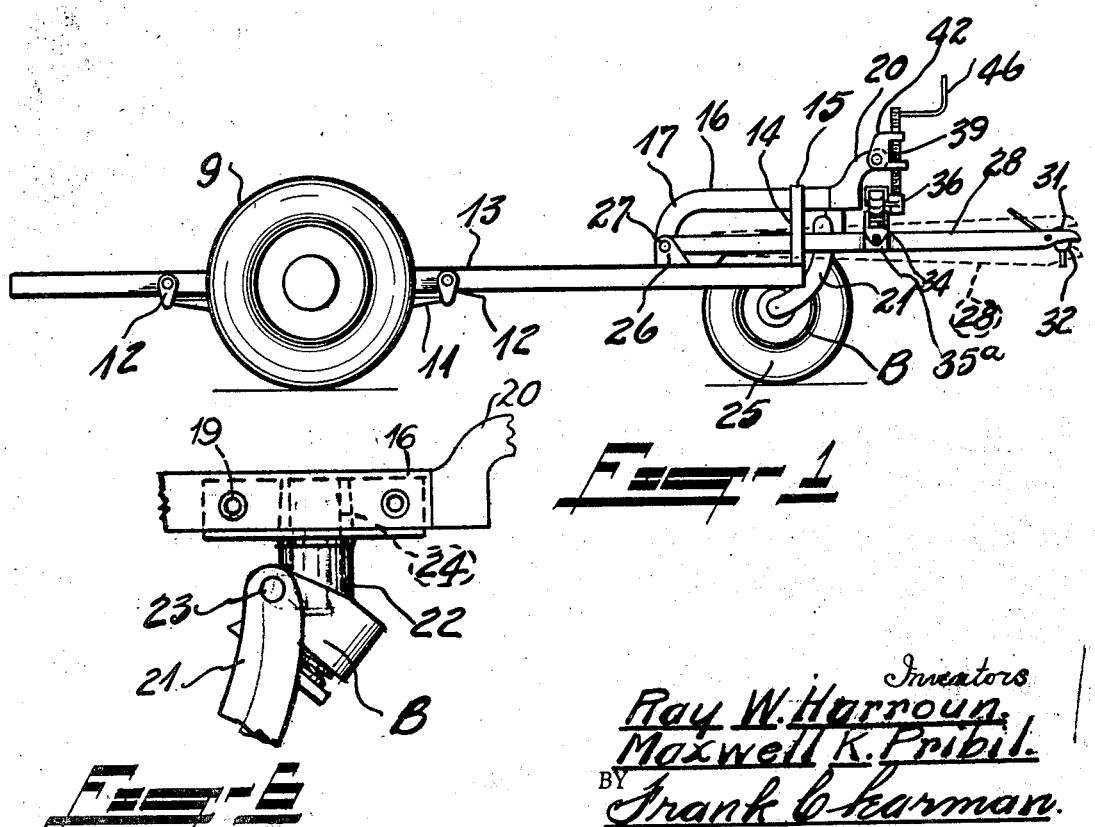

Feb. 2, 1943.  R. W. HARROUN ET AL  2,309,766
AUTOMOTIVE TRAIN
Filed Sept. 16, 1939  3 Sheets-Sheet 3
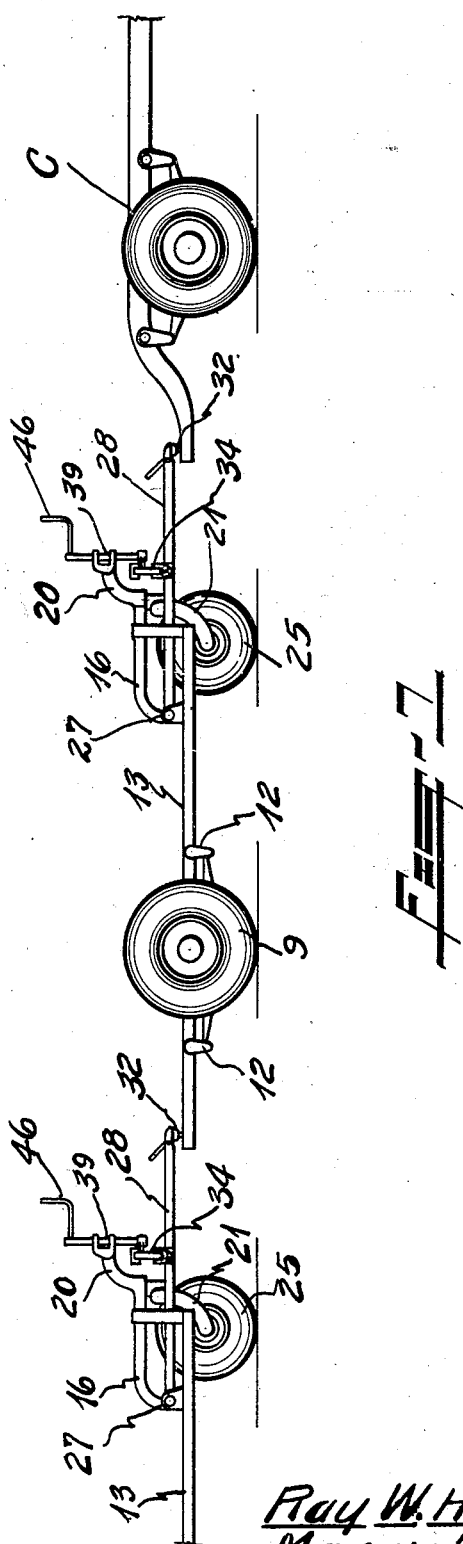
Inventors
Ray W. Harroun.
Maxwell K. Pribil.
BY Frank C. Harman
ATTORNEY.

Patented Feb. 2, 1943

2,309,766

UNITED STATES PATENT OFFICE 2,309,766

AUTOMOTIVE TRAIN

Ray W. Harroun and Maxwell K. Pribil, Saginaw, Mich.; said Harroun assignor of one-sixth to Helen M. Harroun, Saginaw, Mich., and said Pribil assignor of one-fourth to Severina Pribil, Saginaw, Mich.

Application September 16, 1939, Serial No. 295,306

7 Claims. (Cl. 280—33.44)

This invention relates to multi-wheeled towable vehicles, and more particularly to vehicles of the class known as trailers, which are connected to and drawn by a power vehicle.

One of the prime objects of the invention is to provide an automotive train comprising one or more trailers and a towing vehicle, each trailer vehicle being provided with means for regulating the hitch load on each of the trailers and on the power vehicle.

Another object is to provide a trailer unit including an adjustable load regulating means which can be regulated to facilitate the coupling and uncoupling of the trailer from the towing vehicle.

A further object is to provide a trailer chassis unit including means interposed between the front end of the trailer frame and the hitch tongue, which reacts against the differential motion between the towing vehicle and the trailer chassis, thus stabilizing any pitching action when traveling over rough and uneven roadways.

A still further object is to provide a trailer chassis which can be attached to a power vehicle in the same manner as a conventional trailer, which is an independent mobile unit when disconnected, and which can be easily parked in a limited parking space.

A further object still is to design a rugged, practical, and easily operable adjusting means, which can be economically manufactured and assembled, and which can be readily applied.

A still further object is to provide a trailer having a coupling member hingedly connected thereto with the outer end universally and detachably connected to another vehicle and provide mean interposed intermediate the ends of the coupling member for resisting the relative vertical movement between the vehicles as they travel over the roadway.

With the above and other objects in view, the present invention consists in the combination and arrangement of parts, hereinafter more fully described, illustrated in the accompanying drawings, and more particularly pointed out in the appended claims, it being understood that changes may be made in the size, form, proportions, and minor details of construction, without departing from the spirit, or sacrificing any of the advantages of the invention.

In the drawings:

Fig. 1 is a side elevational view of our trailer chassis unit, the broken lines indicating the adjustment.

Fig. 2 is a top plan view thereof.

Fig. 3 is an enlarged, fragmentary side elevational view of the adjusting mechanism, the spring being shown in section.

Fig. 4 is a front view thereof.

Fig. 5 is a top plan view illustrating the self aligning front wheel, the broken lines showing the wheel in different positions.

Fig. 6 is a fragmentary sectional view, illustrating the swiveled mounting of the wheel fork.

Fig. 7 is a side elevational view showing several units connected together to form an automotive train.

Referring now more particularly to the drawings in which we have shown the preferred embodiment of our invention, the numeral 9 indicates a pair of ground engaging wheels which are mounted on an axle 10 as usual, springs 11 are mounted on this axle and are provided with shackles 12 for connecting the springs to the frame 13 in the conventional manner, the front end of said frame being raised to form a kick-up which includes the uprights 14 connected at their upper ends by means of the cross member 15, all of which are rigidly welded together to form a rigid integral part of the main frame.

Forwardly extending braces 16 are rigidly secured to the longitudinally disposed side members of the main frame, and are bowed upwardly as at 17, thence extending forwardly and being welded to the member 15. A bearing structure 18 is secured to these braces 16 at a point adjacent the member 15 by means of bolts 19, said braces terminating in an upwardly curved neck section 20, and for a purpose to be presently described.

The forward end of the frame is supported by a self aligning wheel assembly B, the upper end of the fork 21 being pivotally connected to the member 22 by means of the pin 23, said member 22 being fully revolvable on the pin 24 which forms a part of the bearing assembly.

A ground engaging wheel 25 is mounted in the fork 21, and we do not deem it necessary to describe this wheel assembly in detail as it is substantially the same as that shown in Patent #2,087,299, issued to Alexis R. Pribil under date of July 20, 1937, and while in the present instance we have shown but one front wheel, it will be readily understood that two can be utilized if desired.

Brackets 26 are provided on the opposite sides of the main frame and are suitably bored to accommodate a transversely disposed shaft 27, which shaft also extends through the brace members 16. The trailer unit is connected to the towing vehicle C by means of a hitch tongue 28, said tongue comprising spaced apart members 29, the front ends of which converge and are secured together by means of a coupling plate 30 provided with a socket 31 adapted to releasably accommodate a ball member 32 which is mounted on the towing vehicle C in the conventional manner, the opposite ends being formed with bearings 33 adapted to pivotally connect the hitch tongue to the shaft 27.

The adjusting mechanism is interposed between the hitch tongue and the braces 16, which form a part of the main frame, a transversely disposed spring 34 spanning the hitch tongue and being connected to conventional shackles 35 which are rockably mounted on tubular projections 35a secured to said tongue.

A centrally disposed tubular member 36 is secured to the spring 34 and is formed with an offset flat section 37 which is placed in facial contact with the spring, U-bolts 38 serving to secure it rigidly in position. The adjusting mechanism can be of any desired design, and in the present construction we utilize a threaded screw member 39, the lower end of which is revolvably mounted in the tubular member 36 which is bored to receive it, said lower end of the screw being turned and shouldered as at 40, the extreme end being threaded to receive a nut 41 to secure the parts in assembled relation.

A yoke-shaped member 42 is pivotally mounted on the end of the neck 20 by means of the bolt 43, said yoke being formed with vertically spaced tubular threaded sections 44 and 45 respectively, adapted to accommodate the threaded section of the adjusting screw, a crank 46 being provided on the upper end of said screw to facilitate manual manipulation thereof for adjustment as desired.

Under certain conditions in actual practice, it is highly desirable to place a predetermined hitch load on the tow-car or relieve the tow-car of all of the nose load of the trailer, and this we accomplish by providing the self aligning wheel assembly as above described, and then by manipulation of the crank, the load on the tow-car can be regulated from zero to several hundred pounds, depending upon the load and general road conditions, this also facilitates the coupling and uncoupling of the trailer from the tow-car, because the coupling can be relieved of all load by regulating the adjusting mechanism, so that there will be no strain on said coupling.

These trailer units can be readily connected together to form an automotive train, the flexibility of each unit lending itself to this idea, so that one tow-car C can economically handle several trailers hooked together to form a train, and as clearly shown in Fig. 7 of the drawings.

The construction is particularly advantageous in stabilizing the pitching action between trailer units and the power vehicle as they are drawn over rough and uneven roadways by said power vehicle, such pitching action being resisted by spring 34 and the adjusting means which is interposed between the vehicle frame member 20 and the hitch tongue 28, this further prevents any so called "jack knifing" of the connected vehicles when the train is traveling down hill or on a steep grade, or when the brakes are suddenly applied, under such conditions the tendency is to override the vehicle in front, and this is eliminated in the instant construction which definitely spaces the vehicles by maintaining the hitch tongue in substantially horizontal alignment with relation to the vehicle at all times.

Ready access can be had to the couplings and adjusting means for manipulation of the hitch tongue, and the weight carried can be readily distributed as desired.

It, of course, will be understood that brakes (not shown) can be provided on the trailer chassis and connected to the power vehicle in the usual manner.

From the foregoing description, it will be obvious that we have perfected a very simple, practical, and economical trailer having means for stabilizing any pitching action between the tow-car and the trailer, and whereby the hitch load on the tow-car can be regulated as desired.

What we claim is:

1. A trailer vehicle of the class described and comprising a wheeled main frame adapted to be connected to a power vehicle and provided with a raised extension, a forked hitch tongue pivotally connected to said frame at a point spaced rearwardly from the end of said extension and having universal connection with the power vehicle, shackles pivotally mounted on said hitch tongue, a transversely disposed spring having its ends connected to said shackled and adjustable means interposed between said raised extension and said spring for spacing them with relation to each other.

2. A trailer vehicle of the class described and comprising a main frame having rear wheels and a self aligning front wheel, a raised overhanging extension on said frame, a hitch tongue pivotally connected to said frame at a point spaced rearwardly from the front end and comprising spaced apart bar members hingedly connected to the trailer vehicle, shackles mounted on said bars, a spring spanning said tongue, with its ends connected to said shackles, and adjustable means pivotally mounted on said extension and connected to said spring for vertically adjusting said tongue and frame with relation to each other.

3. A trailer vehicle of the class described and comprising a main frame having rear wheels and a self aligning front wheel, a raised section on the main frame, a hitch tongue pivotally connected to said frame at a point spaced rearwardly from the front end thereof and comprising spaced apart bars, stabilizing means mounted on said vehicle and comprising a transversely disposed spring spanning said tongue and pivotally connected thereto, and manually adjustable means pivotally mounted on the raised section of the frame and revolvably connected to said spring for vertically adjusting the frame and tongue with relation to each other.

4. The combination with a powered vehicle, of a trailer unit connected thereto and comprising a wheeled frame, a raised section on said frame, a hitch tongue comprising spaced bars pivotally connected to the main frame and having universal connection with the power vehicle shackles pivotally mounted on said bars, a resilient means mounted on said tongue and connected to said shackles, and adjustable means pivotally mounted on the frame extension and revolvably connected to said resilient means for transferring part of the trailer load to the power vehicle.

5. The combination with a power vehicle, of a trailer unit adapted to be drawn thereby and comprising a wheeled frame, a raised extension on said frame, a hitch tongue pivotally connected to the frame at a point intermediate its length, and comprising spaced bars, said bars converging and being universally connected to the power vehicle, resilient means spanning said bars, and having shackles connected therewith, a yoke pivotally mounted on the raised extension of the main frame, and an adjusting screw connected to said resilient means and adjustably mounted in said yoke for regulating the load imposed on the power vehicle when the adjusting screw is actuated.

6. An automotive train comprising a towing vehicle and an independently mobile trailing vehicle; said trailing vehicle including a main frame, a rear wheeled truck unit and a castered front wheeled truck unit supporting said frame, resilient means interposed between the truck units and the frame; a coupling member pivotally connecting the sprung frame member of the trailing vehicle to the towing vehicle; said coupling member comprising a forked bar having hinged connection between the forked end of said bar and frame of said trailing vehicle; and a universal connection between the opposite end of said bar and the towing vehicle; and resilient stabilizing means interposed between said frame and said coupling member for resisting the differential pitching action between the coupled ends of said vehicles.

7. An automotive train comprising a towing vehicle and an independently mobile trailing vehicle, said trailing vehicle including a main frame, a rear wheeled truck unit supporting the rear end of the frame, and a castered front wheeled truck unit connected to and supporting the front end of said frame, resilient means interposed between said truck units and the frame; a coupling member pivotally connecting the sprung frame member of said trailing vehicle to the towing vehicle; said coupling member comprising a forked bar having its one end connected to the trailing vehicle frame, and a universal connection between the opposite end of said bar and the towing vehicle frame; and resilient stabilizing means interposed between the said frame and said coupling member for resisting the differential pitching action between the coupled ends of said vehicles; and manually adjustable means for adjusting said stabilizing means.

RAY W. HARROUN.
MAXWELL K. PRIBIL.